Patented Oct. 2, 1923.

1,469,709

UNITED STATES PATENT OFFICE.

HENRI WUYTS, OF BRUSSELS, BELGIUM.

PROCESS FOR THE PREPARATION OF ARTIFICIAL RESINS AND OLEORESINS.

No Drawing. Application filed August 20, 1921. Serial No. 493,939.

*To all whom it may concern:*

Be it known that I, HENRI WUYTS, a subject of the King of the Belgians, residing at Brussels, in the Kingdom of Belgium, have invented certain new and useful Improvements in Processes for the Preparation of Artificial Resins and Oleoresins, of which the following is a specification.

The present invention is a process for the preparation of artificial resins and oleoresins for use in various industries notably in the preparation of varnishes, lacquers, insulators, and mixtures intended for impermeability purposes, and antiseptics or emulsions capable of various uses such as degreasing and cleaning.

This process consists essentially in the reaction, aided by a catalyzer, of phenols (and naphthols) with terpene hydrocarbons such as terebenthine and other essential oils or portions thereof or synthetic products based on the non-saturated hydrocarbons of formula $C_{10}H_{16}$.

The artificial resins and oleoresins thus obtained are composed of ethers of phenol (phenols etherified by terpene radicles) of phenols having terpene radicles substituted in the nucleus and eventually by products of polymerization of the terpene hydrocarbons.

To carry out the invention practically the particular catalyzer which will bring about the desired reaction must be chosen amongst:

a. The strong acids such as hydrochloric, hydrobromic, hydriodic, hydrofluoric, sulphuric, nitric, phosphoric (and its anhydride), oxalic, sulphonic, (in particular paratoluene-sulphonic) acids.

b. Certain salts such as anhydrous aluminium chloride, anhydrous ferric chloride, zinc chloride, certain silicates, certain silicated or siliceous earths suitably prepared, such as Florida earth (floridine or fuller's earth), etc.

c. Certain substances such as chlorine, bromine, iodine.

According to the invention the nature of the catalyzer, the temperature of the reaction the relative proportions of the reacting substance can be varied separately or simultaneously to bring about the orientation of the reaction for preparing sufficient quantities of the compounds hereinbefore referred to and eventually for the exclusive production of one of them. In this way it is possible, in certain cases, to prepare individual substances, and, in all cases to obtain directly, or after selection by treatment with steam or distillation in vacuo, solid resins or oleoresins of greatly varying consistency according to the mode of preparation.

As an example of the preparation of an ether of phenol reference may be made to the action of carvene upon naphthol.

The initial temperature of their equimolecular mixture being about 100° C. the addition of a small quantity of paratoluene-sulphonic acid brings about a considerable rise of temperature. This is maintained below 160° C. Treatment with steam in the presence of a little sodium carbonate eliminates the sulphonic acid, the hydrocarbon and the naphthol not being changed are distilled; the residual oil is insoluble in the alkalis; distilled under a very reduced pressure it shows a constant boiling point; it is an ether of phenol of the formula $C_{10}H_7OC_{10}H_{17}$.

As an example of the preparation of terpene phenols in considerable quantity reference may be made to the reaction of equimolecular quantities of carvene and ordinary phenol in the presence of 0.2 grams of paratoluene-sulphonic acid.

When the spontaneous heating of the mass from 30° C. has reached 105° C. the action is moderated to prevent this temperature being exceeded. The treatment with steam takes place as in the preceding case. It is followed by a treatment with potassium hydroxide or sodium hydroxide which is best effected in the presence of a solvent such as toluene at a temperature from 70° C. to 80° C. in order that the viscosity of the solution may be sufficiently reduced to permit of the reaction and a separation of the two liquid layers. The alkaline liquors after solidification yield the terpene phenols.

The yield of phenols represents about two-thirds of the non-phenolic yield which may be obtained by the evaporation of the solvent.

If in the preceding example chloride of zinc be substituted for the paratoluene-sulphonic acid and the mixture be maintained at a temperature of about 100° C. for a period of 30 hours the phenolic compound obtained is a brittle resin having a considerably higher melting point.

The composition of the resins and the oleoresins poor in oxygen, obtained by the process forming the subject of the invention enables them to be dissolved in hydrocarbon solvents and thus permits of the preparation of inexpensive lacquers or varnishes.

In the presence of alkalis or even small quantities of alkaline carbonates, these resins and oleoresins, as also the non-selected mixtures obtained directly by the action of the catalyzers upon the phenols and terpene hydrocarbons can be emulsified with water to produce extremely stable emulsions. These emulsions are formed even in the presence of resins, such as toluene. They can be eventually utilized for the purpose of degreasing and cleaning.

What I claim is:

1. A process of preparing artificial resins and oleoresins the said process consisting in causing the phenols to react upon terpene hydrocarbons in the presence of a catalyzer.

2. A process of preparing artificial resins and oleoresins consisting in causing the phenols to react upon terpene hydrocarbons in the presence of strong acids, maintaining the temperature below 160° C. and then heating with steam in the presence of sodium carbonate, whereby the acid is eliminated.

3. A process of preparing an ether of phenol said process consisting in causing carvene to react with naphthol in equimolecular quantity by the addition of paratoluene-sulphonic acid, maintaining the temperature below 160° C. then heating with steam, in the presence of sodium carbonate, whereby the sulphonic acid is eliminated and finally distilling the hydrocarbon and the untransformed naphthol.

4. A process or preparing terpene phenols, the said process consisting in causing carvene to act upon phenol in equimolecular quantity in the presence of paratoluene-sulphonic acid, maintaining the temperature below 105° C., then treating with steam and subsequently exhausting with potassium in the presence of a solvent at a temperature of about 70–80° C. and finally separating the two liquid layers whereby the alkaline liquors obtained yield the terpene phenols on solidification.

In testimony whereof I have affixed my signature in the presence of two witnesses.

HENRI WUYTS.

Witnesses:
MARIE CHRISTINE HOUK,
EMILE VAN WARZEELE.